(12) United States Patent
Hou et al.

(10) Patent No.: US 10,798,646 B2
(45) Date of Patent: Oct. 6, 2020

(54) NETWORK SLICE DETERMINING METHOD AND SYSTEM, AND APPARATUS

(71) Applicant: HUAWEI TECHNOLOGIES CO., LTD., Shenzhen, Guangdong (CN)

(72) Inventors: Yihe Hou, Shenzhen (CN); Yan Wang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 58 days.

(21) Appl. No.: 16/204,981

(22) Filed: Nov. 29, 2018

(65) Prior Publication Data
US 2019/0098569 A1 Mar. 28, 2019

Related U.S. Application Data (63) Continuation of application No. PCT/CN2016/084807, filed on Jun. 3, 2016.

(51) Int. Cl.
*H04W 48/18* (2009.01)
*G06F 16/2458* (2019.01)
(Continued)

(52) U.S. Cl.
CPC ........ *H04W 48/18* (2013.01); *G06F 16/2471* (2019.01); *H04W 8/18* (2013.01); *H04W 48/16* (2013.01)

(58) Field of Classification Search
CPC ....... H04W 48/18; H04W 48/16; H04W 8/18; G06F 16/2471
See application file for complete search history.

(56) References Cited

U.S. PATENT DOCUMENTS

2015/0172115 A1 6/2015 Nguyen et al.
2016/0353465 A1* 12/2016 Vrzic .................... H04W 12/06
(Continued)

FOREIGN PATENT DOCUMENTS

CN 103650437 A 3/2014
WO 2017161484 A1 9/2017

OTHER PUBLICATIONS

Nokia, Alcatel-Lucent Shanghai Bell,"Key principles for Slice Selection Support in RAN",3GPP TSG-RAN WG3 Meeting #91bis R3-160735,Bangalore, India, Apr. 11-15, 2016,total 5 pages.
(Continued)

*Primary Examiner* — Min Jung
(74) *Attorney, Agent, or Firm* — Womble Bond Dickinson (US) LLP (57) ABSTRACT

Embodiments of the present disclosure describe a network slice determining method and system, and an apparatus. As discussed with respect to the embodiments described herein, in the communications field, a network slice to which a terminal belongs can be determined for the terminal in a 5G network. The method may include obtaining, by a network selection function (NSF) node, an identity of a terminal. The method may also include sending, by the NSF node, the identity to a home subscriber server (HSS), and then receiving, by the NSF node, a slice identifier of the network slice that is sent by the HSS, where the slice identifier is determined by the HSS based on the identity The method may also include determining, by the NSF node based on the slice identifier, a network slice to which the terminal belongs.

15 Claims, 6 Drawing Sheets (51) Int. Cl.
*H04W 48/16* (2009.01)
*H04W 8/18* (2009.01)

(56) References Cited

U.S. PATENT DOCUMENTS

| | | | |
|---|---|---|---|
| 2017/0142591 A1* | 5/2017 | Vrzic | H04W 24/08 |
| 2017/0332421 A1* | 11/2017 | Sternberg | H04L 12/4641 |
| 2018/0324576 A1* | 11/2018 | Salkintzis | H04W 48/14 |
| 2019/0007899 A1* | 1/2019 | Vrzic | H04W 28/0247 |
| 2019/0021047 A1* | 1/2019 | Zong | H04W 76/11 |
| 2019/0029075 A1 | 1/2019 | Wang et al. | |
| 2019/0037409 A1* | 1/2019 | Wang | H04W 48/18 |
| 2019/0124508 A1* | 4/2019 | Watfa | H04W 8/02 |
| 2019/0124671 A1* | 4/2019 | Starsinic | H04W 12/06 |
| 2019/0159107 A1* | 5/2019 | Kim | H04W 8/02 |

OTHER PUBLICATIONS

3GPP TR 23.799 V0.5.0, 3gpp: "3rd Generation Partnership Project-;Technical Specification Group Services and System Aspects; Study on Architecture for Next Generation System (Release 14)", May 2016. pp. 1-178, XP055464502.

Nokia, Alcatel-Lucent Shanghai Bell,"RAN Selection of CN Entity based on Network Slicing",3GPP TSG-RAN WG3 Meeting #92 R3-161357,Nanjing, China, May 23-27, 2016,total 4 pages.

Huawei et al: "UE Slice Association/Overload control Procedure",3GPP TSG SA WG2 Meeting#115, S2-162981, Nanjing, China May 2016. XP051116481.

LG Electronics Inc.,"Consideration on network slice selection",3GPP TSG-RAN WG3 Meeting # 92 R3-161237, Nanjing, China, May 23-27, 2016,total 4 pages

* cited by examiner

NETWORK SLICE DETERMINING METHOD AND SYSTEM, AND APPARATUS

CROSS-REFERENCE TO RELATED APPLICATIONS

This application is a continuation of International Application No. PCT/CN2016/084807, filed on Jun. 3, 2016, the disclosure of which is hereby incorporated by reference in its entirety.

TECHNICAL FIELD

This application relates to the communications field, and in particular, to a network slice determining method and system, and an apparatus.

BACKGROUND

To provide communication services to different application scenarios (such as an Internet of Vehicles application scenario, a video application scenario, as well as other scenarios), networks serving different application scenarios need to be isolated in a 5G (5th generation mobile communication) network. Therefore, a concept of a network slice is proposed in a 5G network. The network slice is a set including a series of core network functions and access network functions that are customized for a specific application scenario or service model. In other words, one network slice may include a core network slice and an access network slice. As specified in 3GPP (3rd generation partnership project), network slicing is mainly for a core network in a current stage, and therefore it is common that an access network is shared and core network slices are logically isolated in the 5G network.

In a DECOR (dedicated core) network technology, an access network node may forward an access request of a terminal to a default core network node. Because core network nodes share information about different dedicated core networks, the default core network node may determine, for the terminal based on the information about the different dedicated core networks, a dedicated core network to which the terminal belongs.

However, in the 5G network, after an access network node receives an access request of a terminal, because different network slices are mutually isolated and are unaware of existence of each other, the access network node is unable to directly determine, for the terminal by using a core network node in a network slice, a network slice to which the terminal belongs, and therefore is unable to connect the terminal to the network slice to which the terminal belongs.

SUMMARY

Embodiments of the present invention provide a network slice determining method and system, and an apparatus, so that a network slice to which a terminal belongs can be determined for the terminal in a 5G network.

To achieve the foregoing objective, the following technical solutions are used in the embodiments of the present invention.

According to a first aspect, an embodiment of the present invention provides a network slice determining method, including: obtaining, by an NSF (network selection function) node, an identity of a terminal; sending, by the NSF node, the identity to an HSS (home subscriber server); then receiving, by the NSF node, a slice identifier of the network slice that is sent by the HSS, where the slice identifier is determined by the HSS based on the identity; and finally determining, by the NSF node based on the slice identifier, a network slice to which the terminal belongs.

In this case, the NSF node may feed back, to an access network node, the slice identifier of the network slice to which the terminal belongs, so that the access network node connects the terminal to the network slice indicated by the slice identifier, in other words, implements, in a heterogeneous network slice system, a process of connecting the terminal to the network slice to which the terminal belongs.

In a possible design, the NSF node stores a correspondence between a slice identifier of a network slice and network slice attribute information, and each piece of network slice attribute information includes at least one of a terminal type, a service type, and a location range that are supported by a network slice corresponding to the network slice attribute information.

In this case, the determining, by the NSF node based on the slice identifier, a network slice to which the terminal belongs includes: querying, by the NSF node based on the prestored correspondence between a slice identifier of a network slice and network slice attribute information, network slice attribute information corresponding to the slice identifier; obtaining, by the NSF node, assistance information of the terminal, where the assistance information includes at least one of a terminal type of the terminal, a service type requested by the terminal, and location information of the terminal; and if the assistance information meets the network slice attribute information, determining, by the NSF node, a network slice indicated by the slice identifier as the network slice to which the terminal belongs.

Therefore, a network slice meeting network slice attribute information may be determined for the terminal based on a correspondence between slice identifiers of different network slices and different network slice attribute information, and the network slice is determined as the network slice to which the terminal belongs. This prevents reliability of accessing a network slice by a terminal from being reduced because a terminal not meeting the network slice attribute information accesses the network slice.

In a possible design, the NSF node prestores a correspondence between a slice identifier of a network slice and an identifier of a core network ingress node in the network slice.

In this case, after the determining, by the NSF node based on the slice identifier, a network slice to which the terminal belongs, the method further includes: determining, by the NSF node based on the prestored correspondence between a slice identifier of a network slice and an identifier of a core network ingress node in the network slice, an identifier of a core network ingress node corresponding to the slice identifier; and sending, by the NSF node, the identifier of the core network ingress node to an access network node, where the identifier of the core network ingress node is used to instruct the access network node to connect the terminal to the core network ingress node corresponding to the identifier of the core network ingress node.

In a possible design, the obtaining, by an NSF node, an identity of a terminal includes: receiving, by the NSF node through a uniform interface, the identity of the terminal that is sent by the access network node.

In other words, instead of continuing to use various interfaces used in interaction between the access network node and a core network node to send an unchanged initial attach request of the terminal to the NSF node, the access network node sends and receives messages in a protocol format stipulated for the uniform interface. In this way, it is simpler to dispose an interface between the access network node and the NSF node.

In a possible design, the obtaining, by an NSF node, an identity of a terminal includes: receiving, by the NSF node, an initial attach request of the terminal that is sent by the access network node, where the initial attach request carries the identity of the terminal; and performing, by the NSF node, signaling parsing on the initial attach request to obtain the identity of the terminal.

In other words, the NSF node has a function of performing signaling parsing on signaling of different signaling types in the heterogeneous network slice system. Therefore, for initial attach requests of different signaling types forwarded by the access network node, the NSF node may obtain the identity of the terminal through signaling parsing, so that the NSF node obtains the slice identifier of the network slice to which the terminal belongs from the HSS based on the identity of the terminal.

In a possible design, the NSF node prestores a correspondence between a signaling type and a parsing identifier of the signaling type. In this case, the performing, by the NSF node, signaling parsing on the initial attach request to obtain the identity of the terminal includes: determining, by the NSF node based on the prestored correspondence between a signaling type and a parsing identifier of the signaling type, a parsing identifier corresponding to a signaling type of the initial attach request; and performing, by the NSF node, signaling parsing on the initial attach request based on the parsing identifier to obtain the identity of the terminal.

In a possible design, before the performing, by the NSF node, signaling parsing on the initial attach request to obtain the identity of the terminal, the method further includes: receiving, by the NSF node, a parsing identifier that is corresponding to a signaling type of the initial attach request and that is sent by the access network node. In this case, the performing, by the NSF node, signaling parsing on the initial attach request to obtain the identity of the terminal includes: performing, by the NSF node, signaling parsing on the initial attach request based on the parsing identifier to obtain the identity of the terminal.

The parsing identifier is a transport layer port number of the initial attach request.

According to a second aspect, an embodiment of the present invention provides an NSF node, including an obtaining unit, configured to: obtain an identity of a terminal, and receive a slice identifier of the network slice that is sent by an HSS, where the slice identifier is determined by the HSS based on the identity; a sending unit, configured to send the identity to the HSS; and a determining unit, configured to determine, based on the slice identifier, a network slice to which the terminal belongs.

In a possible design, the NSF node prestores a correspondence between a slice identifier of a network slice and network slice attribute information, and each piece of network slice attribute information includes at least one of a terminal type, a service type, and a location range that are supported by a network slice corresponding to the network slice attribute information.

In this case, the obtaining unit is further configured to obtain assistance information of the terminal, where the assistance information includes at least one of a terminal type of the terminal, a service type requested by the terminal, and location information of the terminal; and the determining unit is specifically configured to: query, based on the prestored correspondence between a slice identifier of a network slice and network slice attribute information, network slice attribute information corresponding to the slice identifier; and if the assistance information meets the network slice attribute information, determine a network slice indicated by the slice identifier as the network slice to which the terminal belongs.

In a possible design, the NSF node prestores a correspondence between a slice identifier of a network slice and an identifier of a core network ingress node in the network slice.

In this case, the determining unit is further configured to determine, based on the prestored correspondence between a slice identifier of a network slice and an identifier of a core network ingress node in the network slice, an identifier of a core network ingress node corresponding to the slice identifier; and the sending unit is further configured to send the identifier of the core network ingress node to an access network node, where the identifier of the core network ingress node is used to instruct the access network node to connect the terminal to the core network ingress node corresponding to the identifier of the core network ingress node.

In a possible design, the obtaining unit is specifically configured to receive, through a uniform interface, the identity of the terminal that is sent by the access network node.

In a possible design, the NSF node further includes a parsing unit. The obtaining unit is further configured to receive an initial attach request of the terminal that is sent by the access network node, where the initial attach request carries the identity of the terminal. The parsing unit is configured to perform signaling parsing on the initial attach request to obtain the identity of the terminal.

In a possible design, the NSF node prestores a correspondence between a signaling type and a parsing identifier of the signaling type. The parsing unit is specifically configured to: determine, based on the prestored correspondence between a signaling type and a parsing identifier of the signaling type, a parsing identifier corresponding to a signaling type of the initial attach request; and perform signaling parsing on the initial attach request based on the parsing identifier to obtain the identity of the terminal.

In a possible design, the obtaining unit is further configured to receive a parsing identifier that is corresponding to a signaling type of the initial attach request and that is sent by the access network node. The parsing unit is specifically configured to perform signaling parsing on the initial attach request based on the parsing identifier to obtain the identity of the terminal.

According to a third aspect, an embodiment of the present invention provides an NSF node, including a processor, a memory, a bus, and a communications interface. The memory is configured to store a computer executable instruction. The processor is connected to the memory by using the bus, and when the NSF node runs, the processor executes the computer executable instruction stored in the memory, so that the NSF node executes the network slice determining method according to any possible design of the first aspect.

According to a fourth aspect, an embodiment of the present invention provides a network slice determining system. The system includes the network selection function NSF node according to any possible design of the second aspect, and an HSS and an access network node that are both connected to the NSF node.

According to a fifth aspect, an embodiment of the present invention provides a computer storage medium, configured to store a computer software instruction used by the foregoing NSF node, where the computer software instruction includes a program designed for executing the foregoing aspect by the NSF node.

In the embodiments of the present invention, a name of the NSF node does not constitute a limitation on devices or function modules. During actual implementation, these devices or function modules may have other names. All devices or function modules with functions similar to those in the embodiments of the present invention fall within the scope defined by the claims and equivalent technologies of the embodiments of the present invention.

In addition, for a technical effect brought by any design manner in the second aspect to the fifth aspect, refer to technical effects brought by different design manners in the first aspect. Details are not described herein again.

These or other aspects of the present invention are more concise and comprehensible in descriptions of the following embodiments.

BRIEF DESCRIPTION OF DRAWINGS

To describe the technical solutions in the embodiments of the present invention more clearly, the following briefly describes the accompanying drawings required for describing the embodiments or the prior art.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the present invention, "a plurality of" means two or more, unless otherwise indicated.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
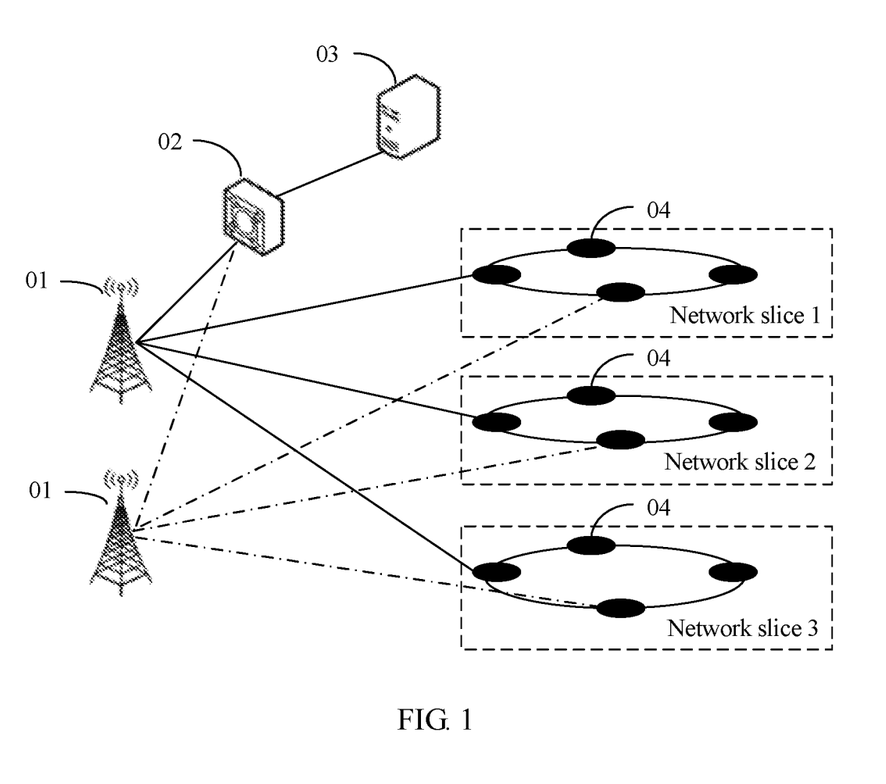
FIG. 1 is a schematic architectural diagram of a network slice determining system according to an embodiment of the present invention.

An embodiment of the present invention provides a network slice determining method, and the method may be applied to a network slice determining system shown in FIG. 1. The system includes an access network node 01, for example, an eNodeB, an NSF (network selection function) node 02, an HSS (home subscriber server) 03, and a core network node 04, for example, an MME (mobility management entity).

Each network slice may include one or more core network nodes 04, configured to implement a service function for a specific application scenario or service model. For example, a network slice 1 is configured to provide a high-definition video service, and a network slice 2 is configured to serve each terminal that subscribes to the Internet of Vehicles. Each access network node 01 may directly interact with terminals belonging to different network slices, and the terminals may access different network slices by sharing an access network.

It should be noted that, to implement the network slice determining method provided in this embodiment of the present invention, a new network element, namely, the NSF node 02 is introduced to the system. The NSF node 02 serves the access network node 01. The NSF node 02 is separately connected to each access network node 01 and the HSS 03, and is configured to determine, for a terminal, a network slice to which the terminal belongs, and feed back the determined network slice to a corresponding access network node 01, so that the access network node 01 establishes an association relationship between the terminal and the network slice.

It may be understood that the NSF node 02 may execute the network slice determining method provided in this embodiment of the present invention as an independent network element. Alternatively, the NSF node 02 may be integrated into any network element device in an existing network architecture in a form of a function node. For example, the NSF node 02 may be integrated into the HSS 03, so that the HSS 03 implements the following various operations and functions of the NSF node 02. This is not limited in this embodiment of the present invention.

In addition, the terminal in this embodiment of the present invention is any device that prepares to access a network slice to which the terminal belongs, such as a mobile phone, an in-vehicle device, or a notebook computer. This is not limited in this embodiment of the present invention.

Figure 2:
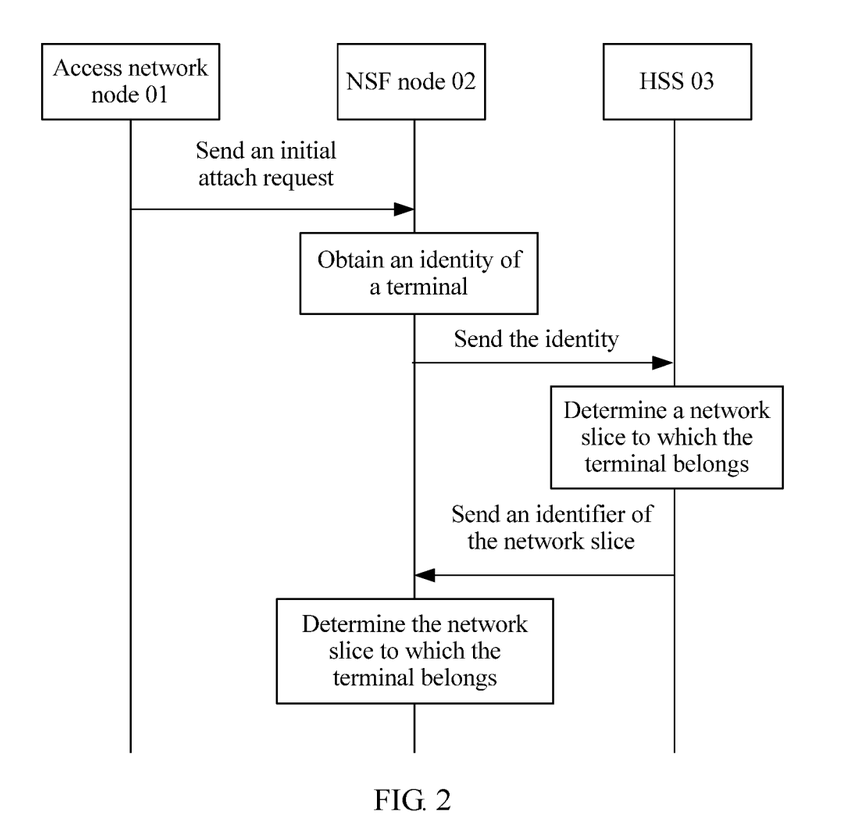
FIG. 2 is a schematic interaction diagram 1 of a network slice determining method according to an embodiment of the present invention.

Specifically, as shown in FIG. 2, the NSF node 02 may receive an initial attach request sent by the access network node 01, to obtain an identity of the terminal. For example, the identity is an international mobile subscriber identity (IMSI) of the terminal. Then the NSF node 02 sends the identity to the HSS 03, so that the HSS 03 determines, based on the identity, a network slice to which the terminal belongs, namely, a network slice to which the terminal subscribes. The HSS 03 sends a slice identifier of the determined network slice to the NSF node 02, and the NSF node 02 may determine, based on the slice identifier, the network slice to which the terminal belongs. Subsequently, the NSF node 02 may feed back, to the access network node 01, the slice identifier of the determined network slice to which the terminal belongs, and the access network node 01 may connect the terminal to a network slice indicated by the slice identifier of the determined network slice.

Herein, because terminals belonging to different network slices may use different signaling formats, the terminals belonging to different network slices use different signaling types to send an initial attach request. Therefore, the access network node 01 or the NSF node 02 needs to have a function of performing signaling parsing on signaling of different signaling types. For example, after the access network node 01 forwards the initial attach request to the NSF node 02, the NSF node 02 parses the initial attach request based on a signaling type of the initial attach request to obtain the identity of the terminal. Alternatively, after receiving the initial attach request sent by the terminal, the access network node 01 directly parses the initial attach request based on a signaling type of the initial attach request to obtain the identity of the terminal, and sends the identity to the NSF node 02, so that the NSF node 02 sends the identity to the HSS 03, and therefore the HSS 03 can determine the network slice to which the terminal belongs.

The following embodiments describe the foregoing two network slice determining methods in detail, and therefore details are not described herein.

Figure 3:
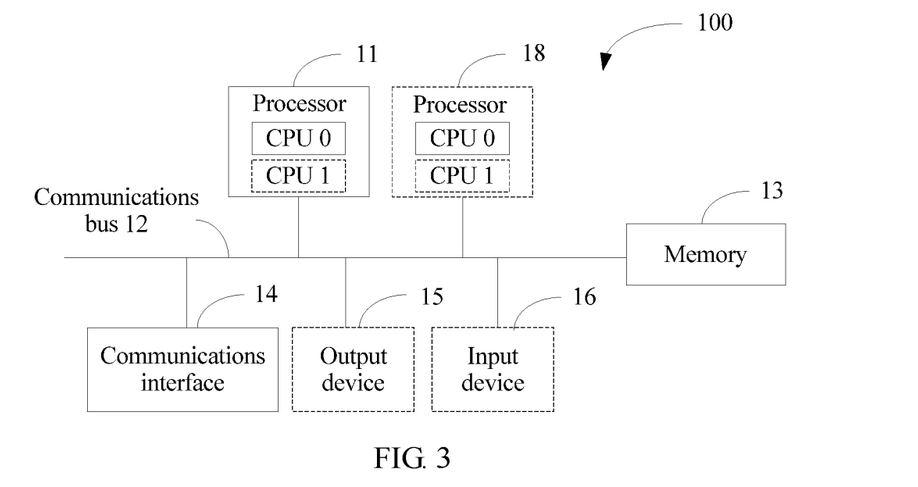
FIG. 3 is a schematic structural diagram of a computer device according to an embodiment of the present invention.

As shown in FIG. 3, the NSF node 02 in FIG. 1 may be implemented by using a computer device (or a system) in FIG. 3.

FIG. 3 is a schematic diagram of the computer device according to an embodiment of the present invention. The computer device 100 includes at least one processor 11, a communications bus 12, a memory 13, and at least one communications interface 14.

The processor 11 may be a general-purpose central processing unit (CPU), a microprocessor, an application-specific integrated circuit (ASIC), or one or more integrated circuits configured to control program execution of the solutions of the present invention.

The communications bus 12 may include a channel for transmitting information between the foregoing components. The communications interface 14 is any transceiver-like apparatus, and is configured to communicate with another device or a communications network, such as the Ethernet, a radio access network (RAN), or a wireless local area network (WLAN).

The memory 13 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other optical disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer, but is not limited thereto. The memory may exist independently, and is connected to the processor by using the communications bus. Alternatively, the memory may be integrated with the processor.

The memory 13 is configured to store application program code for executing the solutions of the present invention, and the processor 11 controls the execution. The processor 11 is configured to execute the application program code stored in the memory 13.

For example, in the network slice determining method provided in the embodiments of the present invention, the processor 11 in the NSF node 02 may obtain an identity of a terminal by using the communications interface 14, and then send the identity to the HSS 03 by using the communications interface 14. The HSS 03 determines, based on the identity, an identifier of a network slice to which the terminal belongs, and sends the slice identifier of the network slice to the NSF node 02. The NSF node 02 receives, by using the communications interface 14, the slice identifier of the network slice that is sent by the HSS 03, and the processor 11 determines, based on the slice identifier, the network slice to which the terminal belongs.

The memory 13 in the NSF node 02 may store a correspondence between a slice identifier of a network slice and network slice attribute information. The network slice attribute information includes at least one of a terminal type, a service type, and a location range that are supported by a network slice corresponding to the network slice attribute information. Therefore, when determining, based on the slice identifier, the network slice to which the terminal belongs, the processor 11 may further determine whether the terminal is a terminal supported by the network slice. This prevents a terminal not meeting the network slice attribute information from accessing the network slice.

In addition, the memory 13 in the NSF node 02 may further store a correspondence between a slice identifier of each network slice and an identifier of a core network ingress node in the network slice. Therefore, after determining the network slice to which the terminal belongs, the processor 11 may further determine an identifier of a core network ingress node in the network slice based on the slice identifier of the determined network slice, so that the access network node 01 connects the terminal to the corresponding core network ingress node in the network slice.

During specific implementation, in an embodiment, the processor 11 may include one or more CPUs, for example, a CPU 0 and a CPU 1 in FIG. 3.

During specific implementation, in an embodiment, the computer device 100 may include a plurality of processors, for example, the processor 11 and a processor 18 in FIG. 3. Each of the processors may be a single-core (single-CPU) processor, or may be a multi-core (multi-CPU) processor. The processor herein may be one or more devices, circuits, and/or processing cores for processing data (for example, a computer program instruction).

During specific implementation, in an embodiment, the computer device 100 may further include an output device 15 and an input device 16. The output device 15 communicates with the processor 11, and may display information in a plurality of manners. For example, the output device 15 may be a liquid crystal display (LCD), a light emitting diode (LED) display device, a cathode ray tube (CRT) display device, or a projector. The input device 16 communicates with the processor 11, and may receive a user input in a plurality of manners. For example, the input device 16 may be a mouse, a keyboard, a touchscreen device, or a sensing device.

The computer device 100 may be a general-purpose computer device or a dedicated computer device. During specific implementation, the computer device 100 may be a desktop computer, a portable computer, a network server, a palmtop computer (PDA), a mobile phone, a tablet computer, a wireless terminal device, a communications device, an embedded device, or a device with a structure similar to that in FIG. 3. A type of the computer device 100 is not limited in this embodiment of the present invention.

It should be noted that in this embodiment of the present invention, any function node in the system, for example, the NSF node 02, may be implemented by using one physical device or jointly implemented by using a plurality of physical devices. A plurality of function nodes in the system may be implemented by using different physical devices or a same physical device. It may be understood that any function node in the system may be a logical function module in a physical device or a logical function module including a plurality of physical devices.

Further, to more clearly describe the network slice determining method provided in the present invention, the following uses a logical function module as an execution body for description. A person skilled in the art may understand that, during specific implementation, the logical function module needs to depend on a hardware resource of a physical device on which the logical function module is located.

In addition, in the embodiments of the present invention, the network slice determining system may be applied to a 5G network, a Long Term Evolution (LTE) network, an evolved LTE communications network such as an LTE-A (Long Term Evolution Advanced) system, a 3rd Generation (3G) mobile communications network such as WCDMA (Wideband Code Division Multiple Access), or the like. This is not limited in the present invention.

Specifically, composition of the NSF node 02 and an interface standard between the NSF node 02 and the access network node 01 are not unique, but vary with implementation solutions. Details are described in the following embodiments.

Figure 4:
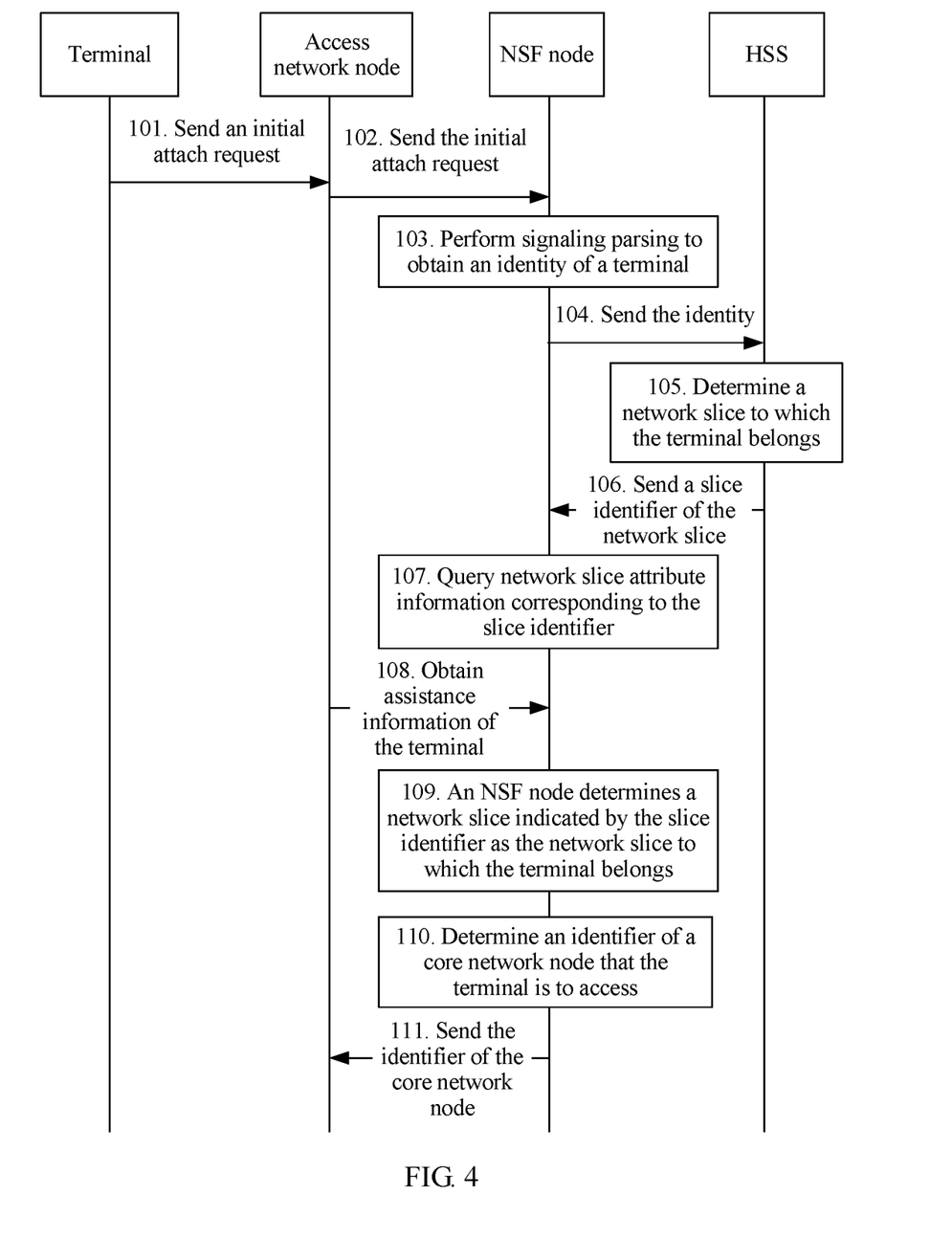
FIG. 4 is a schematic interaction diagram 2 of a network slice determining method according to an embodiment of the present invention.

Based on the network slice determining system shown in FIG. 1, an embodiment of the present invention provides a network slice determining method. An NSF node has a function of performing signaling parsing on signaling of different signaling types. As shown in FIG. 4, the method includes:

101. A terminal sends an initial attach request to an access network node, where the initial attach request carries an identity of the terminal.

102. The access network node sends the initial attach request to the NSF node.

103. The NSF node performs signaling parsing on the initial attach request to obtain the identity of the terminal.

104. The NSF node sends the identity to an HSS.

105. After receiving the identity, the HSS determines, based on the identity, a slice identifier of a network slice to which the terminal belongs.

106. The HSS sends the determined slice identifier of the network slice to the NSF node.

107. After receiving the slice identifier of the network slice, the NSF node queries, based on the slice identifier, network slice attribute information corresponding to the slice identifier, where the NSF node stores a correspondence between slice identifiers of different network slices and different network slice attribute information, and each piece of network slice attribute information includes at least one of a terminal type, a service type, and a location range that are supported by a network slice corresponding to the network slice attribute information.

108. If the NSF node finds the network slice attribute information corresponding to the slice identifier, the NSF node obtains assistance information of the terminal, where the assistance information includes at least one of a terminal type of the terminal, a service type requested by the terminal, and location information of the terminal.

109. If the assistance information matches the network slice attribute information, the NSF node determines a network slice indicated by the slice identifier as the network slice to which the terminal belongs.

110. The NSF node determines, based on the slice identifier, an identifier of a core network node that the terminal is to access, where the NSF node prestores a correspondence between a slice identifier of a network slice and an identifier of any core network node in the network slice.

111. The NSF node sends the identifier of the core network node to the access network node, so that the access network node connects the terminal to the core network node.

In step 101, when the terminal needs to access a network slice, an access network usually establishes an association relationship between the terminal and the network slice, and the access network node in the access network connects the terminal to a core network node in the network slice.

In this case, the terminal may send the initial attach request to the access network node, where the initial attach request carries the identity of the terminal, for example, an IMSI of the terminal.

In step 102, the access network node sends the initial attach request to the NSF node.

Various interfaces used in interaction between the access network node and the core network node may continue to be used as various interfaces used in interaction between the access network node and the NSF node. For example, an S1AP (S1 Application Protocol) based interface used between the access network node (for example, an eNodeB) and the core network node (for example, an MME) continues to be used.

It should be noted that terminals belonging to network slices of different types may use different signaling types to send an initial attach request. For example, a terminal that subscribes to a network slice of an EPC (evolved packet core) type may send an initial attach request to the access network node by using signaling of a NAS (network attached storage) type, and then the access network node forwards the initial attach request to the core network node. In a future 5G network, the terminal may need to use a non-NAS signaling type to interact with the core network node. This is not limited in this embodiment of the present invention.

Correspondingly, an interface protocol used between the access network node and the core network may also be different. For example, the S1AP protocol is used between the eNodeB and the MME, and in the future 5G network, another protocol (for example, Diameter) may be used in interaction between the access network node and the core network. This is not limited in this embodiment of the present invention.

In step 103, the NSF node performs signaling parsing on the received initial attach request to obtain the identity of the terminal.

Signaling of different types is corresponding to different parsing identifiers. For example, signaling of an S1AP type is corresponding to a parsing identifier 001.

Signaling parsing modules are separately disposed on the NSF node for different parsing identifiers. In other words, different parsing identifiers are used to indicate different signaling parsing modules. For example, if a signaling parsing module 1 to a signaling parsing module 10 are disposed on the NSF node, the NSF node can perform signaling parsing on initial attach requests of 10 different signaling types. In other words, the signaling parsing module 1 to the signaling parsing module 10 are separately corresponding to 10 different parsing identifiers.

Therefore, the NSF node may determine a parsing identifier of the initial attach request based on a signaling type of the initial attach request. For example, when the initial attach request is signaling of the NAS type, the NSF node may determine that a corresponding parsing identifier is 002, and the NSF node may use, based on the parsing identifier 002, a signaling parsing module corresponding to 002 to perform signaling parsing on the initial attach request, to obtain the identity of the terminal through parsing.

For example, the parsing identifier may be a transport layer port number. Specifically, the transport layer port number may be an SCTP (Stream Control Transmission Protocol) port number, a TCP (Transmission Control Protocol) port number, or a UDP (User Datagram Protocol) port number. For example, the signaling of the S1AP type is corresponding to an SCTP port number 36412.

In this case, when the access network node forwards the initial attach signaling request to the NSF node by using the signaling of the S1AP type, the NSF node may determine that an SCTP port number used to forward the initial attach signaling request is 36412. Therefore, the NSF node may use, based on the transport layer port number, a corresponding signaling parsing module to perform signaling parsing on the initial attach request, to obtain the identity of the terminal through parsing.

Alternatively, during creation of a network slice of the terminal, a signaling type corresponding to the network slice and a transport layer port number corresponding to the signaling type may be determined. Therefore, during creation of the network slice of the terminal, a correspondence between the signaling type and the transport layer port number may be set in the access network node, in other words, a correspondence between the signaling type and a parsing identifier is set in the access network node. In this case, after receiving the initial attach request, the access network node may determine, based on the signaling type of the initial attach request, a transport layer port number of the initial attach request. The access network node may directly send the transport layer port number and the initial attach request to the NSF node, and the NSF node may directly use a signaling parsing module corresponding to the transport layer port number to perform signaling parsing on the initial attach request, without determining the transport layer port number of the initial attach request, to obtain the identity of the terminal.

Further, in step 104, the NSF node sends the identity obtained through parsing to the HSS, so that the HSS determines, based on the identity, the slice identifier of the network slice to which the terminal belongs.

Specifically, the HSS stores user subscription information of each terminal, and the user subscription information is used to indicate a correspondence between an identity of each terminal and a slice identifier of a network slice to which the terminal subscribes. Therefore, after receiving the identity of the terminal, the HSS may find, based on the user subscription information, the slice identifier of the network slice to which the terminal belongs, to determine the network slice to which the terminal belongs.

In step 105, the HSS sends the determined slice identifier of the network slice to the NSF node.

The slice identifier of the network slice may be an ID (identification) of the network slice.

In step 106, the NSF node receives the slice identifier of the network slice that is sent by the HSS.

It should be noted that one terminal may have a subscription relationship with a plurality of network slices, in other words, one terminal may belong to a plurality of network slices. Therefore, there may be one or more slice identifiers of network slices that are sent by the HSS. This is not limited in this embodiment of the present invention.

In addition, during creation of the network slice of the terminal, a correspondence between slice identifiers of different network slices and different network slice attribute information may be stored on the NSF node. Each piece of network slice attribute information includes at least one of a terminal type, a service type, and a location range that are supported by a network slice corresponding to the network slice attribute information. For example, network slice attribute information corresponding to a network slice 1 is a list of one or more terminal types, and indicates all terminal types supported by the network slice 1.

As shown in Table 1, a network slice with a slice identifier 01 is corresponding to a network slice attribute 1. For example, the network slice attribute 1 is used to indicate that a terminal type supported by the network slice with the slice identifier 01 is a mobile phone terminal. To be specific, only when a terminal that requests access and the network slice with the slice identifier 01 have a subscription relationship with each other, and a terminal type of the terminal is a mobile phone, the terminal is allowed to access the network slice with the slice identifier 01.

TABLE 1

| Slice identifier | Network slice attribute information |
| --- | --- |
| 01 | Network slice attribute 1 |
| 02 | Network slice attribute 2 |
| 03 | Network slice attribute 1 |

In this case, in step 107, the NSF node queries, based on the slice identifier sent by the HSS in step 106, the network slice attribute information corresponding to the slice identifier. For example, if the slice identifier sent by the HSS is 02, according to Table 1, network slice attribute information corresponding to the slice identifier 02 is a network slice attribute 2. The network slice attribute 2 is used to indicate that a location range supported by a network slice with the slice identifier 02 is a region 1. In other words, only when the terminal is located in the region 1, the terminal meets the network slice attribute 2.

Further, in step 108, the NSF node may obtain the assistance information of the terminal from the access network node, where the assistance information includes at least one of the terminal type of the terminal, the service type requested by the terminal, and the location information of the terminal.

When the terminal subscribes to a network slice, the terminal may learn of network slice attribute information of the network slice. Therefore, assistance information reported by the terminal to the access network node is usually corresponding to specific content in the network slice attribute information of the network slice. To be specific, when the network slice attribute 1 is used to restrict the terminal type of the terminal, the assistance information reported by the terminal to the access network node is also the terminal type of the terminal; and when the network slice attribute 2 is used to restrict a location range of the terminal, the assistance information reported by the terminal to the access network node is also the location information of the terminal.

It should be noted that an execution sequence between step 108 and steps 102 to 107 is not limited in this embodiment of the present invention. For example, when sending the initial attach request in step 101, the terminal may add the assistance information to the initial attach request and send the assistance information to the access network node, so that the access network node can send the assistance information to the NSF node in step 102. Alternatively, the NSF node may obtain the assistance information of the terminal at any moment before performing step 109. This is not limited in this embodiment of the present invention.

Further, in step 109, the NSF node determines, based on the obtained assistance information of the terminal, whether the assistance information matches the network slice attribute information. To be specific, if the terminal type of the terminal in the assistance information is a supported terminal type in the network slice attribute information, or if the service type requested by the terminal in the assistance information is a supported service type in the network slice attribute information, or if the location information of the terminal in the assistance information is a supported location range in the network slice attribute information, it may be considered that the assistance information matches the network slice attribute information.

For example, the assistance information is the location information of the terminal, and the location information indicates that the terminal is located at a location 1; and the network slice attribute information is a network slice attribute 2, and the network slice attribute 2 indicates that a location range supported by a network slice with a slice identifier 02 is a region 1. In this case, the NSF node determines whether the location 1 falls within the region 1, and if the location 1 falls within the region 1, the assistance information matches the network slice attribute information. In this case, the NSF node determines the network slice indicated by the slice identifier as the network slice to which the terminal belongs, in other words, determines the network slice with the slice identifier 02 as the network slice to which the terminal belongs.

Therefore, a network slice meeting the network slice attribute information may be determined for the terminal based on the correspondence between slice identifiers of different network slices and different network slice attribute information, and the network slice is determined as the network slice to which the terminal belongs. To be specific, when the network slice to which the terminal belongs is being determined for the terminal, on the basis of the slice identifier of the network slice that is provided by the HSS, network slice selection may be further performed based on the assistance information such as the terminal type, the service type requested by the terminal, and the location information of the terminal. This prevents reliability of accessing a network slice by a terminal from being reduced because a terminal not meeting the network slice attribute information accesses the network slice, so that bases for network slice selection are more diversified.

Certainly, corresponding network slice attribute information may not be set for all network slices. Therefore, after the NSF node performs step 107 in which the NSF node queries, based on the slice identifier sent by the HSS, the network slice attribute information corresponding to the slice identifier, if no network slice attribute information corresponding to the slice identifier is found, the NSF node may directly determine the network slice indicated by the slice identifier as the network slice to which the terminal belongs.

In addition, if there are a plurality of slice identifiers of network slices that are sent by the HSS in step 105, in other words, the terminal subscribes to a plurality of network slices, the NSF node may separately determine, according to the method described in steps 107 to 109, whether the terminal meets network slice attribute information corresponding to each network slice. When determining that the terminal meets network slice attribute information of a plurality of network slices, the NSF node may determine, based on priorities of the different network slices, a high-priority network slice as the network slice to which the terminal belongs.

In this case, the NSF node may send the determined slice identifier to the access network node, and then the access network node may determine, based on the slice identifier, that the terminal needs to access a core network ingress node specified in the network slice indicated by the slice identifier, and connect the terminal to the core network ingress node. In this way, a process of accessing the network slice can be completed.

Alternatively, the NSF node may prestore a correspondence between a slice identifier of a network slice and an identifier of a core network ingress node in the network slice. For example, a network slice 1 includes five different core network nodes, and a core network node 1 is a core network ingress node in the network slice 1. When accessing the network slice 1, the terminal can access the network slice 1 only after the terminal establishes a connection to the core network node 1. Therefore, the NSF node may prestore a correspondence between a slice identifier of the network slice 1 and an identifier of the core network node 1.

In this case, in step 110, the NSF node determines, based on the correspondence between slice identifiers of different network slices and identifiers of different core network nodes, the identifier of the core network node corresponding to the slice identifier obtained in step 109.

The identifier of the core network node may be specifically an IP address of the core network node or an MMEGI (MME group ID) of the core network node.

Further, in step 111, the NSF node sends the identifier of the core network node to the access network node, so that the access network node directly connects the terminal to the core network node based on the identifier of the core network node. In this way, a process of accessing the network slice can be completed.

Steps performed by the NSF node in steps 101 to 111 may be implemented by the NSF node according to the program instruction that is stored in the memory 13 and that is executed by the processor 11 in FIG. 3.

In this way, the NSF node parses the initial attach request of the terminal to obtain the identity of the terminal, and determines, based on the identity by interacting with the HSS, the slice identifier of the network slice to which the terminal belongs. Therefore, a network slice meeting the network slice attribute information is determined for the terminal based on the correspondence between slice identifiers of different network slices and different network slice attribute information, and the network slice is determined as the network slice to which the terminal belongs. This resolves a problem of how to determine, for the terminal in a 5G network, the network slice to which the terminal belongs.

In addition, it can be learned from steps 101 to 111 that, during creation of any network slice, to implement the network slice determining method, the following content needs to be preconfigured: the interface between the access network node and the NSF node, the correspondence between a slice identifier of a network slice and network slice attribute information, and the correspondence between a slice identifier of a network slice and an identifier of any core network node in the network slice, where the two correspondences are on the NSF node.

Figure 5:
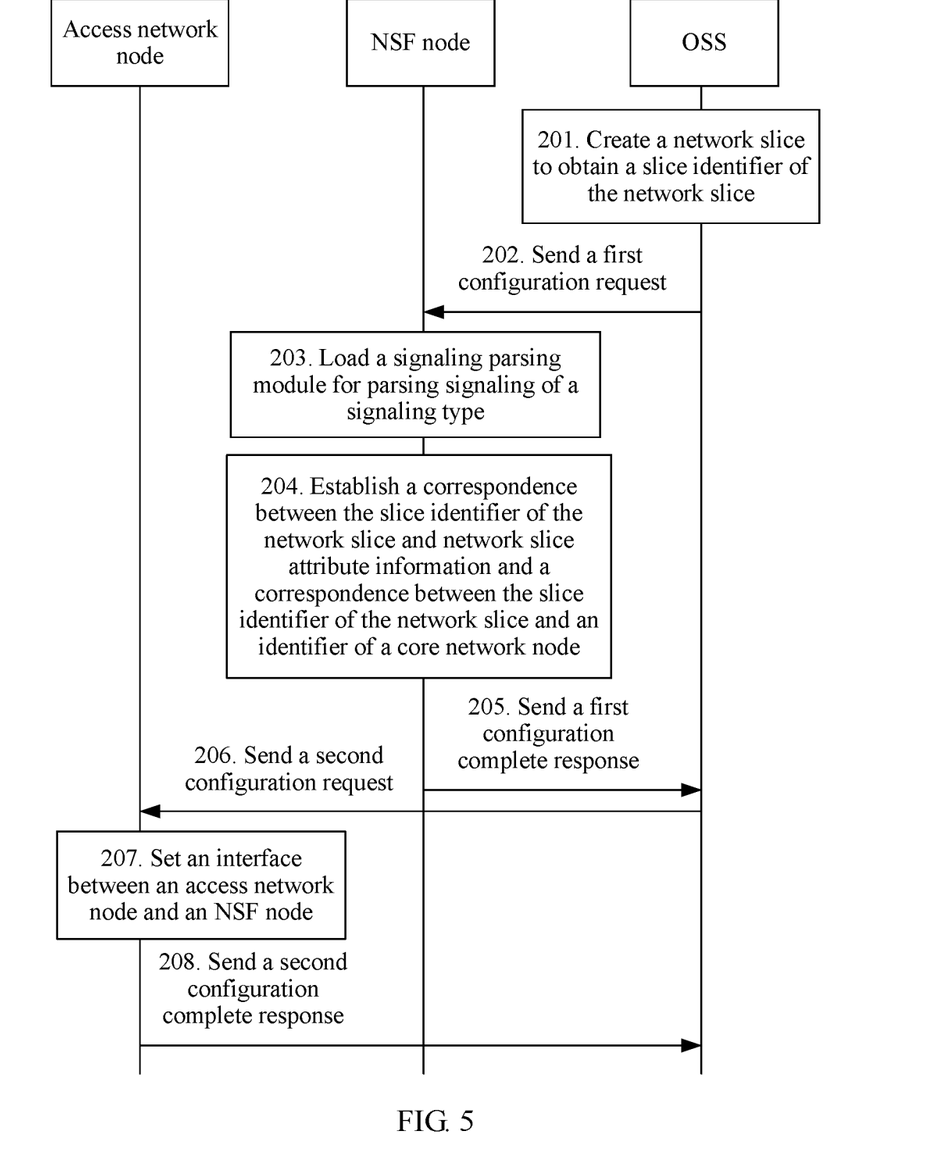
FIG. 5 is a schematic interaction diagram 3 of a network slice determining method according to an embodiment of the present invention.

Specifically, as shown in FIG. 5, for the process of creating a network slice, refer to steps 201 to 208.

201. An OSS (operations support system) interacts with an NFV-MANO (network functions virtualization management and orchestration, NFV management and orchestration) node to create a network slice, to obtain a slice identifier of the network slice.

202. The OSS sends a first configuration request to an NSF node, where the first configuration request carries the slice identifier of the network slice, network slice attribute information of the network slice, an identifier of a to-be-accessed core network ingress node in the network slice, and a signaling type supported by the network slice.

203. If the NSF node cannot perform signaling parsing on signaling of the signaling type, the NSF node loads a signaling parsing module for parsing the signaling of the signaling type.

204. The NSF node establishes a correspondence between the slice identifier of the network slice and the network slice attribute information of the network slice and a correspondence between the slice identifier of the network slice and the identifier of the core network node.

205. The NSF node sends a first configuration complete response to the OSS, where the first configuration complete response is used to notify the OSS that the NSF node completes initialization configuration of the network slice.

206. The OSS sends a second configuration request to an access network node, where the second configuration request carries an identifier of the NSF node.

207. The access network node sets an interface between the access network node and the NSF node according to the second configuration request.

208. The access network node sends a second configuration complete response to the OSS, where the second configuration complete response is used to notify the OSS that the NSF node completes initialization configuration of the network slice.

In step 201, an NFV (network functions virtualization) technology in a 5G network may be used. The new network slice is created by using a network slice instantiation method, to obtain the slice identifier of the network slice.

In step 202, after the new network slice is created, in addition to the slice identifier of the network slice, the OSS may obtain the network slice attribute information of the network slice, the identifier of the to-be-accessed core network ingress node in the network slice, and the signaling type supported by the network slice. In this case, the OSS sends the first configuration request to the NSF node, where the first configuration request is used to instruct the NSF node to perform initialization configuration on the newly created network slice, so that a network slice to which the terminal belongs can be subsequently determined for the terminal.

Specifically, the first configuration request carries the slice identifier of the network slice, the network slice attribute information of the network slice, the identifier of the to-be-accessed core network ingress node in the network slice, and the signaling type supported by the network slice.

The initialization configuration specifically includes: configuring, for the NSF node, a function of performing signaling parsing on the signaling of the signaling type supported by the network slice, establishing the correspondence between the slice identifier of the network slice and the network slice attribute information of the network slice, and establishing the correspondence between the slice identifier of the network slice and the identifier of the core network ingress node.

In this case, in step 203, the NSF node may first find out whether a signaling parsing module corresponding to the signaling type supported by the network slice has been created. If no corresponding signaling parsing module is found, the NSF node currently cannot perform signaling parsing on the signaling of the signaling type. In this case, the NSF node may obtain, from the OSS, data or a component required by a signaling parsing module for parsing the signaling of the signaling type, and then load, based on the data or the component, the signaling parsing module for parsing the signaling of the signaling type.

In step 204, the NSF node establishes the correspondence between the slice identifier of the network slice and the network slice attribute information of the network slice based on the slice identifier of the network slice and the network slice attribute information of the network slice that are carried in the first configuration request, so that the NSF node subsequently determines whether the terminal meets the network slice attribute information, to determine whether the terminal belongs to a network slice indicated by the slice identifier of the network slice.

In addition, the NSF node establishes the correspondence between the slice identifier of the network slice and the identifier of the to-be-accessed core network ingress node in the network slice based on the slice identifier of the network slice and the identifier of the core network ingress node that are carried in the first configuration request, so that the NSF node subsequently determines a core network node that is in the network slice and that the terminal is to access.

After completing initialization configuration, in step 205, the NSF node sends the first configuration complete response to the OSS to notify the OSS that the NSF node completes initialization configuration of the network slice.

In this case, in step 206, the OSS sends the second configuration request to the access network node, where the second configuration request carries the identifier of the NSF node.

The identifier of the NSF node may be an IP address of the NSF node.

In step 207, the access network node sets the interface between the access network node and the NSF node based on the second configuration request.

Various interfaces used in interaction between the access network node and the core network node may continue to be used as the interface used in interaction between the access network node and the NSF node.

In addition, as described in step 103, the second configuration request may further carry a correspondence between the signaling type supported by the newly created network slice and a transport layer port number. In this case, after receiving an initial attach request of the terminal, the access network node may determine a transport layer port number of the initial attach request based on a signaling type of the initial attach request. The access network node may directly send the transport layer port number and the initial attach request to the NSF node. The NSF node may directly use a signaling parsing module corresponding to the transport layer port number to perform signaling parsing on the initial attach request to obtain an identity of the terminal.

Finally, in step 208, the access network node sends the second configuration complete response to the OSS, to notify the OSS that the access network node completes initialization configuration of the network slice. In this case, the OSS may notify a user that the network slice has been created.

Steps performed by the NSF node in steps 201 to 208 may be implemented by the NSF node according to the program instruction that is stored in the memory 13 and that is executed by the processor 11 in FIG. 3.

Figure 6:
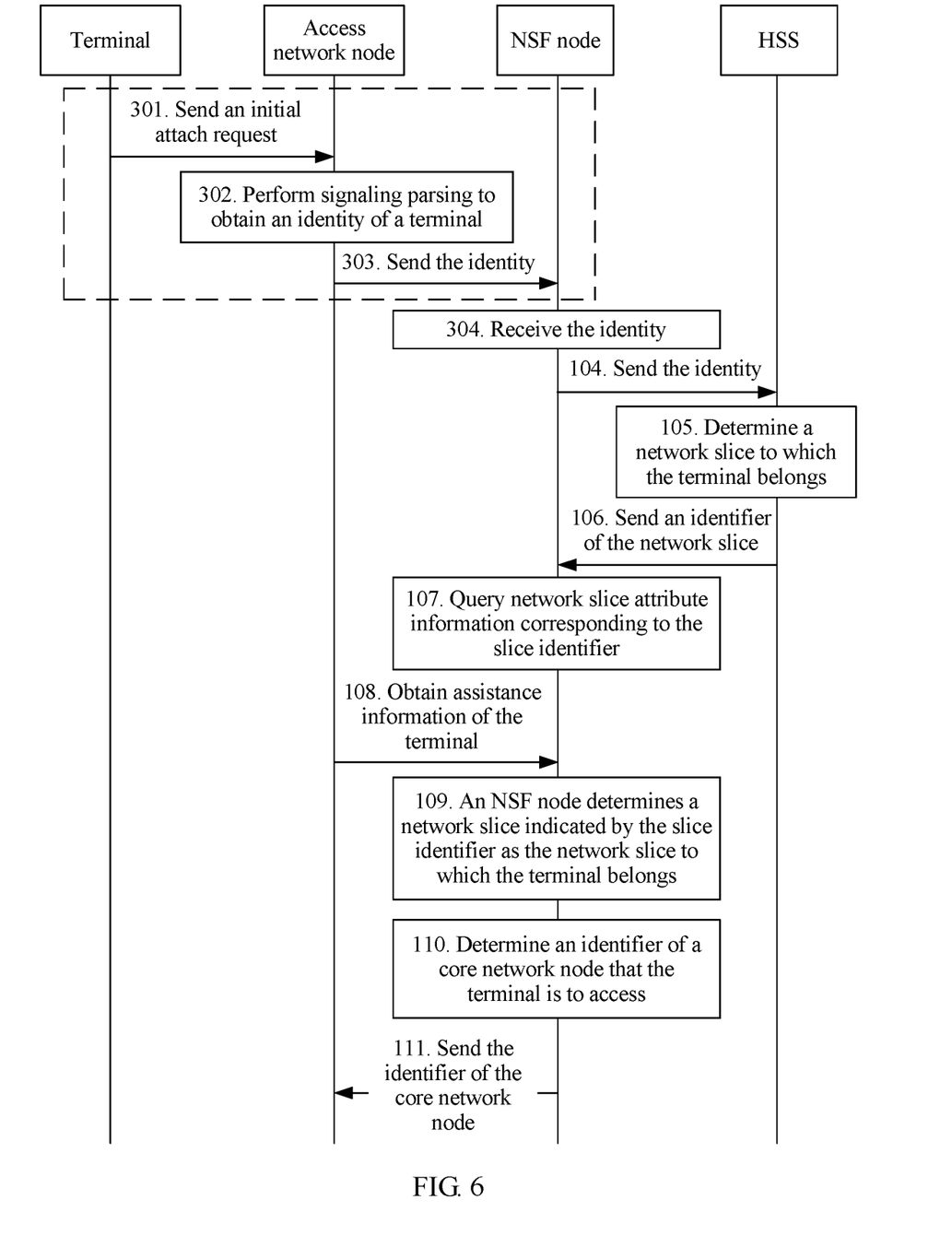
FIG. 6 is a schematic interaction diagram 4 of a network slice determining method according to an embodiment of the present invention.

In addition, based on the network slice determining method described in steps 101 to 111, in another possible design, the access network node may be set to have a function of performing signaling parsing on signaling of different signaling types. In this case, steps 101 to 103 may be replaced with steps 301 to 304. Specifically, as shown in FIG. 6, steps 301 to 304 specifically include:

301. A terminal sends an initial attach request to an access network node, where the initial attach request carries an identity of the terminal.

302. The access network node performs signaling parsing on the initial attach request to obtain the identity of the terminal.

303. The access network node sends the identity to an NSF node through a uniform interface.

304. The NSF node receives the identity sent by the access network node.

In step 301, the terminal sends the initial attach request to the access network node, where the initial attach request carries the identity of the terminal.

Herein terminals belonging to network slices of different types use different signaling types to send an initial attach request.

Therefore, in step 302, the access network node may perform signaling parsing on the initial attach request to obtain the identity of the terminal that is carried in the initial attach request, for example, an IMSI of the terminal.

Similar to the foregoing case in which the NSF node performs signaling parsing on the received initial attach request, the access network node may preset signaling parsing modules for signaling of different types. The access network node may select, based on a signaling type of the initial attach request, a corresponding signaling parsing module to perform signaling parsing to obtain the identity of the terminal. For a specific method for selecting the corresponding signaling parsing module to perform signaling parsing, refer to related descriptions in step 103 in the foregoing embodiment. Details are not described herein again.

In this way, an inner structure of the NSF node can be greatly simplified. In this case, there is no need to continue to use various interfaces used in interaction between the access network node and the core network node, but instead the uniform interface may be used as an interface for interaction between the access network node and the NSF node.

In other words, in comparison with steps 101 to 103, instead of sending the unchanged initial attach request of the terminal to the NSF node, the access network node sends and receives messages in a protocol format stipulated for the uniform interface. In this way, it is simpler to dispose the interface between the access network node and the NSF node.

In step 303, the access network node sends the identity to the NSF node by using the uniform interface.

In step 304, the NSF node receives the identity sent by the access network node.

Subsequently, the method described in steps 104 to 111 may still be used to determine a network slice to which the terminal belongs. Details are not described herein again.

Steps performed by the NSF node in steps 301 to 304 may be implemented by the NSF node according to the program instruction that is stored in the memory 13 and that is executed by the processor 11 in FIG. 3.

In this way, the access network node parses the initial attach request of the terminal to obtain the identity of the terminal, and sends the identity to the NSF node by using the uniform interface, so that the NSF node determines, based on the identity by interacting with an HSS, a slice identifier of the network slice to which the terminal belongs. Therefore, a network slice meeting network slice attribute information may be determined for the terminal based on a correspondence between slice identifiers of different network slices and different network slice attribute information, and the network slice is determined as the network slice to which the terminal belongs. This resolves a problem of how to determine, for the terminal in a 5G network, the network slice to which the terminal belongs.

Figure 7:
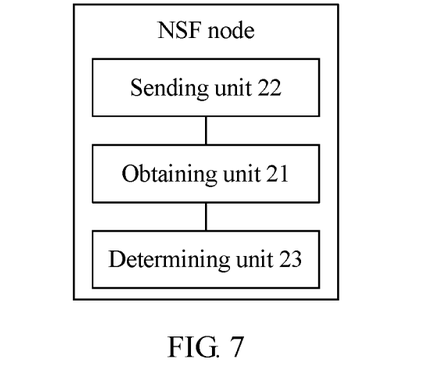
FIG. 7 is a schematic structural diagram 1 of an NSF node according to an embodiment of the present invention.

FIG. 7 is a schematic structural diagram of an NSF node according to an embodiment of the present invention. The NSF node provided in this embodiment of the present invention may be used to implement the methods implemented in the embodiments of the present invention shown in FIG. 1 to FIG. 6. For ease of description, only a part related to this embodiment of the present invention is illustrated. For specific technical details not disclosed, refer to the embodiments of the present invention shown in FIG. 1 to FIG. 6.

Specifically, the NSF node includes:

an obtaining unit 21, configured to: obtain an identity of a terminal, and receive a slice identifier of the network slice that is sent by an HSS, where the slice identifier is determined by the HSS based on the identity;

a sending unit 22, configured to send the identity to the HSS; and a determining unit 23, configured to determine, based on the slice identifier, a network slice to which the terminal belongs.

Further, the NSF node prestores a correspondence between a slice identifier of a network slice and network slice attribute information, and each piece of network slice attribute information includes at least one of a terminal type, a service type, and a location range that are supported by a network slice corresponding to the network slice attribute information;

the obtaining unit 21 is further configured to obtain assistance information of the terminal, where the assistance information includes at least one of a terminal type of the terminal, a service type requested by the terminal, and location information of the terminal; and the determining unit 23 is specifically configured to: query, based on the prestored correspondence between a slice identifier of a network slice and network slice attribute information, network slice attribute information corresponding to the slice identifier; and if the assistance information meets the network slice attribute information, determine a network slice indicated by the slice identifier as the network slice to which the terminal belongs.

Further, the NSF node prestores a correspondence between a slice identifier of a network slice and an identifier of a core network ingress node in the network slice;

the determining unit 23 is further configured to determine, based on the prestored correspondence between a slice identifier of a network slice and an identifier of a core network ingress node in the network slice, an identifier of a core network ingress node corresponding to the slice identifier; and the sending unit 22 is further configured to send the identifier of the core network ingress node to an access network node, where the identifier of the core network ingress node is used to instruct the access network node to connect the terminal to the core network ingress node corresponding to the identifier of the core network ingress node.

Further, the obtaining unit 21 is specifically configured to receive, through a uniform interface, the identity of the terminal that is sent by the access network node.

Figure 8:
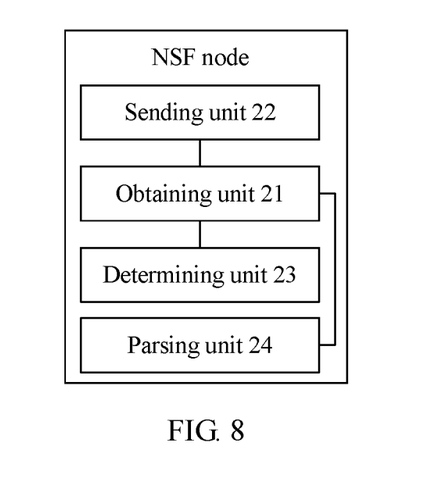
FIG. 8 is a schematic structural diagram 2 of an NSF node according to an embodiment of the present invention.

Further, as shown in FIG. 8, the NSF node further includes a parsing unit 24;

the obtaining unit 21 is further configured to receive an initial attach request of the terminal that is sent by the access network node, where the initial attach request carries the identity of the terminal; and the parsing unit 24 is configured to perform signaling parsing on the initial attach request to obtain the identity of the terminal.

Further, the NSF node prestores a correspondence between a signaling type and a parsing identifier of the signaling type; and the parsing unit 24 is specifically configured to: determine, based on the prestored correspondence between a signaling type and a parsing identifier of the signaling type, a parsing identifier corresponding to a signaling type of the initial attach request; and perform signaling parsing on the initial attach request based on the parsing identifier to obtain the identity of the terminal.

Alternatively, the obtaining unit 21 is further configured to receive a parsing identifier that is corresponding to a signaling type of the initial attach request and that is sent by the access network node; and the parsing unit 24 is specifically configured to perform signaling parsing on the initial attach request based on the parsing identifier to obtain the identity of the terminal.

In this embodiment provided in the present invention, specific functions of the obtaining unit 21 and the sending unit 22 in the NSF node may be implemented by the processor 11 in the computer device 100 shown in FIG. 3 by invoking the communications interface 14, and specific functions of the determining unit 23 and the parsing unit 24 in the NSF node may be implemented by the processor 11 in the computer device 100 shown in FIG. 3 by invoking application program code that is stored in the memory 13 and that is used to execute the solutions of the present invention.

This embodiment of the present invention provides the NSF node. The NSF node obtains the identity of the terminal, and determines, based on the identity by interacting with the HSS, the slice identifier of the network slice to which the terminal belongs. Therefore, a network slice meeting the network slice attribute information is determined for the terminal based on a correspondence between slice identifiers of different network slices and different network slice attribute information, and the network slice is determined as the network slice to which the terminal belongs. This resolves a problem of how to determine, for the terminal in a 5G network, the network slice to which the terminal belongs.

It may be clearly understood by a person skilled in the art that, for the purpose of convenient and brief description, division of the foregoing function modules is used as an example for illustration. During actual application, the foregoing functions can be allocated to different function modules and implemented as required, in other words, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of the present invention. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network slice determining method, comprising:
obtaining, by a network selection function (NSF) node, an identity of a terminal;
sending, by the NSF node, the identity to a home subscriber server (HSS);
receiving, by the NSF node, a slice identifier of a network slice that is sent by the HSS, wherein the slice identifier is determined by the HSS based on the identity; and
determining, by the NSF node based on the slice identifier, a network slice to which the terminal belongs, wherein the determining is based at least in part on a matching of information of the terminal with network slice attribute information for the determined network slice, and wherein the NSF node stores a correspondence between slice identifiers of different network slices and different network slice attribute information, and each piece of network slice attribute information includes at least one of a terminal type, a service type, and a location range that are supported by a network slice corresponding to the network slice attribute information.

2. The method according to claim 1, wherein the NSF node stores a correspondence between a slice identifier of a network slice and an identifier of a core network ingress node in the network slice; and after the determining, by the NSF node based on the slice identifier, the network slice to which the terminal belongs, the method further comprises:

determining, by the NSF node based on the correspondence between a slice identifier of a network slice and an identifier of a core network ingress node in the network slice, an identifier of a core network ingress node corresponding to the slice identifier; and sending, by the NSF node, the identifier of the core network ingress node to an access network node, wherein the identifier of the core network ingress node is used to instruct the access network node to connect the terminal to the core network ingress node corresponding to the identifier of the core network ingress node.

3. The method according to claim 1, wherein the obtaining, by an NSF node, the identity of the terminal comprises:

receiving, by the NSF node through a uniform interface, the identity of the terminal that is sent by the access network node.

4. The method according to claim 1, wherein the obtaining, by an NSF node, the identity of the terminal comprises:

receiving, by the NSF node, an initial attach request of the terminal that is sent by the access network node, wherein the initial attach request carries the identity of the terminal; and performing, by the NSF node, signaling parsing on the initial attach request to obtain the identity of the terminal.

5. The method according to claim 4, wherein the NSF node stores a correspondence between a signaling type and a parsing identifier of the signaling type; and the performing, by the NSF node, signaling parsing on the initial attach request to obtain the identity of the terminal comprises:

determining, by the NSF node based on the correspondence between a signaling type and a parsing identifier of the signaling type, a parsing identifier corresponding to a signaling type of the initial attach request; and performing, by the NSF node, signaling parsing on the initial attach request based on the parsing identifier to obtain the identity of the terminal.

6. The method according to claim 5, wherein the parsing identifier is a transport layer port number of the initial attach request.

7. The method according to claim 4, wherein before the performing, by the NSF node, signaling parsing on the initial attach request to obtain the identity of the terminal, the method further comprises:

receiving, by the NSF node, a parsing identifier that is corresponding to a signaling type of the initial attach request and that is sent by the access network node; and the performing, by the NSF node, signaling parsing on the initial attach request to obtain the identity of the terminal comprises:

performing, by the NSF node, signaling parsing on the initial attach request based on the parsing identifier to obtain the identity of the terminal.

8. A network slice determining method comprising:

obtaining, by a network selection function (NSF) node, an identity of a terminal;

sending, by the NSF node, the identity to a home subscriber server (HSS);

receiving, by the NSF node, a slice identifier of a network slice that is sent by the HSS, wherein the slice identifier is determined by the HSS based on the identity; and determining, by the NSF node based on the slice identifier, a network slice to which the terminal belongs, wherein the NSF node stores a correspondence between a slice identifier of a network slice and network slice attribute information, and the network slice attribute information comprises at least one of a terminal type, a service type, or a location range that are supported by a network slice corresponding to the network slice attribute information; and the determining, by the NSF node based on the slice identifier, the network slice to which the terminal belongs comprises:

querying, by the NSF node based on the correspondence between a slice identifier of a network slice and network slice attribute information, network slice attribute information corresponding to the slice identifier;

obtaining, by the NSF node, assistance information of the terminal, wherein the assistance information comprises at least one of a terminal type of the terminal, a service type requested by the terminal, and location information of the terminal; and if the assistance information matches the network slice attribute information, determining, by the NSF node, a network slice indicated by the slice identifier as the network slice to which the terminal belongs.

9. A network selection function (NSF) node, comprising:

a processor, configured to: obtain an identity of a terminal, and receive a slice identifier of a network slice that is sent by a home subscriber server (HSS), wherein the slice identifier is determined by the HSS based on the identity;

a transceiver, configured to send the identity to the HSS; and the processor, configured to determine, based on the slice identifier, a network slice to which the terminal belongs, wherein the processor to determine the network slice further comprises the processor configured to determine is based at least in part on a matching of information of the terminal with network slice attribute information for the determined network slice, and wherein the NSF node stores a correspondence between slice identifiers of different network slices and different network slice attribute information, and each piece of network slice attribute information includes at least one of a terminal type, a service type, and a location range that are supported by a network slice corresponding to the network slice attribute information.

10. The NSF node according to claim 9, wherein the processor is further configured to:

obtain assistance information of the terminal, wherein the assistance information comprises at least one of a terminal type of the terminal, a service type requested by the terminal, and location information of the terminal, query, based on the correspondence between a slice identifier of a network slice and network slice attribute information, network slice attribute information corresponding to the slice identifier; and if the assistance information matches the network slice attribute information, determine a network slice indicated by the slice identifier as the network slice to which the terminal belongs.

11. The NSF node according to claim 9, wherein the NSF node stores a correspondence between a slice identifier of a network slice and an identifier of a core network ingress node in the network slice;

the processor is further configured to determine, based on the correspondence between a slice identifier of a network slice and an identifier of a core network ingress node in the network slice, an identifier of a core network ingress node corresponding to the slice identifier; and the transceiver is further configured to send the identifier of the core network ingress node to an access network node, wherein the identifier of the core network ingress node is used to instruct the access network node to connect the terminal to the core network ingress node corresponding to the identifier of the core network ingress node.

12. The NSF node according to claim 9, wherein the processor is configured to receive, through a uniform interface, the identity of the terminal that is sent by the access network node.

13. The NSF node according to claim 9, wherein the NSF node further comprises a parsing unit;

the processor is further configured to receive an initial attach request of the terminal that is sent by the access network node, wherein the initial attach request carries the identity of the terminal; and the parsing unit is configured to perform signaling parsing on the initial attach request to obtain the identity of the terminal.

14. The NSF node according to claim 13, wherein the NSF node stores a correspondence between a signaling type and a parsing identifier of the signaling type; and the processor is configured to: determine, based on the correspondence between a signaling type and a parsing identifier of the signaling type, a parsing identifier corresponding to a signaling type of the initial attach request, and perform signaling parsing on the initial attach request based on the parsing identifier to obtain the identity of the terminal.

15. The NSF node according to claim 13, wherein the processor is further configured to:

receive a parsing identifier that is corresponding to a signaling type of the initial attach request and that is sent by the access network node, and perform signaling parsing on the initial attach request based on the parsing identifier to obtain the identity of the terminal.

* * * * *